(12) United States Patent
Khaled

(10) Patent No.: US 11,590,523 B2
(45) Date of Patent: *Feb. 28, 2023

(54) SMART FOUNTAIN WITH PROXIMITY SENSORS AND A DRY CLOSED LOOP SYSTEM LAYOUT

(71) Applicant: Prince Mohammad Bin Fahd University, Dhahran (SA)

(72) Inventor: Nassim Khaled, Covington, GA (US)

(73) Assignee: Prince Mohammad Bin Fahd University, Dhahran (SA)

( * ) Notice: Subject to any disclaimer, the term of this patent is extended or adjusted under 35 U.S.C. 154(b) by 426 days.

This patent is subject to a terminal disclaimer.

(21) Appl. No.: 16/781,263

(22) Filed: Feb. 4, 2020

(65) Prior Publication Data

US 2021/0237110 A1  Aug. 5, 2021

(51) Int. Cl.
*B05B 12/12* (2006.01)
*E03B 9/20* (2006.01)
(Continued)

(52) U.S. Cl.
CPC ............ *B05B 12/122* (2013.01); *B05B 12/02* (2013.01); *B05B 17/08* (2013.01); *E03B 9/20* (2013.01);
(Continued)

(58) Field of Classification Search
CPC ....... B05B 12/122; B05B 12/02; B05B 17/08; E03B 9/20; G05B 19/05; G05B 19/418; B67D 1/00; B67D 1/08
(Continued)

(56) References Cited

U.S. PATENT DOCUMENTS

| 10,166,568 B2* | 1/2019 | Hoeks | B05B 17/08 |
| 2002/0059751 A1* | 5/2002 | Taylor | B05B 17/08 47/65.5 |
| 2013/0214056 A1* | 8/2013 | Schoeren | B05B 17/08 239/17 |

FOREIGN PATENT DOCUMENTS

| CN | 2744420 Y | 12/2005 |
| CN | 204486120 U | 7/2015 |

(Continued)

OTHER PUBLICATIONS

Amha Mogus, "Smart" Water Fountain, http://amhamogus.com/blog/2009/12/04/smart-water-fountain/, 2019, 3 pages.
(Continued)

*Primary Examiner* — Qingzhang Zhou
(74) *Attorney, Agent, or Firm* — Oblon, McClelland, Maier & Neustadt, L.L.P.

(57) ABSTRACT

Proximity triggered water fountains may have proximity sensors configured to detect target(s), a processing unit communicably coupled to proximity sensors configured to transfer data related to the target(s) to the processing unit, nozzles and nozzle controllers, and collectors configured to receive water projected from the nozzles. The nozzle controllers may be controlled based on data received from the sensors. The nozzle controllers may be coupled to the nozzles of a water circulation system configured to adjust a water projection angle from the nozzles with respect to the ground. The water circulation system may use tank(s), pump(s), and supply and return line(s), with the nozzles, tank(s), pump(s), and supply and return line(s), being in fluid communication. The nozzles and collectors may be displaced a horizontal distance from each other such that outlets of the nozzles are not vertically above the collectors.

17 Claims, 5 Drawing Sheets

(51) Int. Cl.
  *B05B 17/08* (2006.01)
  *B05B 12/02* (2006.01)
  *G05B 19/05* (2006.01)
  *G05B 19/418* (2006.01)
  *B67D 1/00* (2006.01)
  *B67D 1/08* (2006.01)

(52) U.S. Cl.
  CPC ........... *G05B 19/05* (2013.01); *G05B 19/418* (2013.01); *B67D 1/00* (2013.01); *B67D 1/08* (2013.01)

(58) Field of Classification Search
  USPC .................................................... 239/17–20
  See application file for complete search history.

(56) References Cited

FOREIGN PATENT DOCUMENTS

| | | |
|---|---|---|
| CN | 105413939 B | 9/2017 |
| KR | 10-1125617 B1 | 4/2012 |

OTHER PUBLICATIONS

"AquaPurr", https://aquapurr.com/, Nov. 13, 2019, 15 pages.

\* cited by examiner

SMART FOUNTAIN WITH PROXIMITY SENSORS AND A DRY CLOSED LOOP SYSTEM LAYOUT

BACKGROUND OF THE INVENTION

Field of the Invention

The present disclosure relates to fountains and water jetting display or decorative arrangements and apparatuses, particular those without open water bodies and/or having sensors to detect the presence and type of animate objects around the fountains and arrangements, especially to adjust the projection of water streams between a source and a receptacle, as well as methods of using and making such fountains/arrangements.

Description of the Related Art

Fountains are architecture pieces which pour water into a basin or jet water into the air to supply drinking water and/or for a decorative or dramatic effect. Fountains were originally purely functional, connected to springs or aqueducts and used to provide drinking water and water for bathing and washing to the residents of cities, towns and villages. Until the late 19th century most fountains operated by gravity, requiring a water source higher than the fountain, such as a reservoir or aqueduct, to make the water flow or jet into the air.

Ancient civilizations built stone basins to capture and hold precious drinking water. A carved stone basin from around 2000 BP (before present era), was discovered in the ruins of the ancient Sumerian city of Lagash in modern Iraq. The ancient Assyrians constructed a series of basins in the gorge of the Comel River, carved in solid rock, connected by small channels, descending to a stream. The lowest basin was decorated with carved reliefs of two lions. The ancient Egyptians built systems for hoisting water from the Nile for drinking and irrigation, but no Egyptian fountains or pictures of fountains have been found.

The ancient Greeks used aqueducts and gravity-powered fountains to distribute water. Fountains existed in Athens, Corinth, and other ancient Greek cities in the 6th century BP as the terminating points of aqueducts which brought water from springs and rivers into the cities. The Athenian ruler Peisistratos built the main fountain of Athens, the Enneacrounos, in the main square (the Agora), with nine large cannons, which supplied drinking water to local residents. Greek fountains were typically made of stone or marble, with water flowing through bronze pipes and emerging from the mouth of a sculpted mask that represented the head of a lion or the muzzle of an animal. Most Greek fountains flowed by simple gravity, but the Greeks also made use of the siphon to make water spout.

The classical Romans built an extensive system of aqueducts from mountain rivers and lakes to provide water for the fountains and baths of Rome and other Roman settlements. Roman engineers used lead pipes instead of bronze to distribute the water throughout the city. Roman cities, like Pompeii, could have free-standing fountains and basins placed at intervals along city streets, fed by siphoning water upwards from lead pipes under the street. Wealthy Romans often had a small fountain in their interior courtyard (atrium), with water coming from the city water supply and spouting into a small bowl or basin.

Towards the end of the 1st century AD, Rome had 9 aqueducts feeding 39 monumental fountains and 591 public basins, not counting imperial households, baths, and private villas. Each major Roman fountain was connected to two different aqueducts to maintain operation during servicing of one of the aqueducts. Roman engineers built aqueducts and fountains throughout the Roman Empire. After the fall of the Roman Empire, fountains continued to be built and used during the Arab Empire, the Ottoman Empire, the Renaissance, and the European Empires, including later restoration of Roman aqueducts and other classical installations.

Modern plumbing made fountains less relevant as the main source of drinking water in the 19th century, and urban fountains became purely decorative. Mechanical pumps replaced gravity and allowed fountains to recycle water and jet water high into the air. Lake Geneva's Jet d'Eau, for example, shoots water 140 meters into the air, and the highest such fountain in the world, King Fand's Fountain in Jeddah, Saudi Arabia, shoots water 260 meters above the Red Sea.

Modern fountains are often used to decorate city parks and squares as well as the interiors and exteriors of large buildings and shopping areas. Many modern fountains continue to rely on bodies of water, such as artificial pools adjacent to the fountains. Given the interest in conserving resources and the lack of water resources in many regions of the world, an interest in diminished water use in fountains has developed, while preserving the effect of the traditional fountain. Certain research in this regard warrants comment.

KR 10-1125617 B1 to Kim et al. (Kim) discloses a smart water play tool, enabling a user to enjoy water play based on operation from a neighboring environment. Kim's tool comprises: a plurality of support stands which are fixed at an interval from the surface; a plurality of injection nozzles installed on the inside wall of the support stand to spray water; a human detection sensor installed in the upper end of the support stand to sense the human body; a distance sensor installed in the upper end of the support stand to measure the distance between the human body and support stand; and an MCU controlling the injection nozzle. Kim has several embodiments using proximity sensors, but Kim's arrangements use either open pools or reservoirs of water and/or fail to capture jets streams in collectors. Kim fails to describe modifying projecting angles according to the proximity of a sensed target.

CN 2744420 Y by Li et al. (Li) discloses a digitally controlled universal swaying spray nozzle for a musical fountain. Li's nozzle can sway in any direction in 3D-space. Li's vertical face rotary control mechanism rotating in the horizontal plane has two stepping motors to drive the rotation, a worm wheel, a worm, a fixed joint, and a movable joint. Li's two stepping motors drive two rotary control mechanism to move independently of the horizontal rotation in its vertical rotation along a central line as 360° rotation, and vice-versa. Li's digitally controlled universal swaying spray nozzle is for a musical fountain. Li does not describe receptacles or reducing water loss in its system.

CN 105413939 B by Yang et al. (Yang) discloses a scenic region fountain control method based on regional division. Yang's method involves dividing a fountain environ into multiple parts, and determining, based on the people in each environ part, whether fountains in water spraying sub-regions corresponding to the environ part(s) are started or not and what independent performance modes are selected. Yang may use sensors and detect occupancy in zones, but Yang does not describe using collectors, multiple jets/streams, or varying water projection angles, heights, and/or locations.

CN 204486120 U by Yu (Yu) discloses a fountain comprising a water trough, a water spraying table, a submerged pump, spraying heads, and human body sensors. Yu's water spraying table and the submerged pump are located in Yu's water trough. Yu's spraying heads are located on the water spraying table. Yu's submerged pump is communicated with the spraying heads through water pipes. Yu's human body sensors are arranged on and evenly distributed on the side wall of the water trough, and are connected with the submerged pump through wires. When Yu's human body sensors sense human activity, the submerged pump is started, the spraying heads start to spray water, and when no person is around the water trough, the submerged pump is shut down. Although Yu's fountain uses sensors, Yu's fountain comprises an open trough/container for the water, which serves as the receptacle for any jetted water, but lacks collectors which are interrupted from the nozzles by the ground and/or surface and/or non-air components between the nozzle and collector.

The web advertisement and article entitled "'Smart' Water Fountain" presented by Amha Mogus (Mogus) in a Dec. 4, 2009, blog discloses typical airport-style stainless steel drinking fountains which may have two sensors on an outward-facing housing of the fountain(s). Mogus' fountain does not describe collectors which are separated from its water jets/spouts by any ground and/or non-air components, nor does Mogus disclose modifying the angle of projection of more than one jet/stream of water or modifying the angle based upon approach distance beyond merely turning on and off.

The web advertisement and article entitled "AquaPurr" presented by AquaPurr eC (AquaPurr) discloses a motion sensing drinking fountain for cats which emits a stream of water when a cat approaches the sensor(s). Although Aqua-Purr contains sensors and turns on when approached by animate objects, such as cats, AquaPurr does not project its water stream upwards, nor does AquaPurr project plural water streams. Moreover, AquaPurr merely projects water downwards into a sink, not a collector, and AquaPurr neither recycles the water nor projects the water stream horizontally over an animate object.

In light of the above, a need remains for fountains and water projecting arrangements, particularly for water-saving installations which can create a pleasant ambience and detect and/or discriminate the size and character of approaching objects, such as humans or animals, and methods of making and using such fountains and water projecting arrangements.

SUMMARY OF THE INVENTION

Aspects of the invention provide proximity triggered water fountains, which may comprise: a first proximity sensor configured to detect at least one target; a second proximity sensor configured to detect the at least one target; a processing unit with which the proximity sensors are communicably coupled, the proximity sensors being further configured to transfer data related to the at least one target to the processing unit; a first nozzle and a first nozzle controller; a second nozzle and a second nozzle controller; and a first collector configured to receive water projected from the first and/or second nozzles, wherein the processing unit is communicably coupled to the nozzle controllers, wherein the nozzle controllers are configured to be controlled according to the data received from the proximity sensors, wherein the nozzle controllers are mechanically coupled to the nozzles of a water circulation system configured to adjust a water projection angle from the nozzles with respect to a plane orthogonal to gravity, wherein the water circulation system comprises a tank, a pump, a supply line, and a return line, the nozzles, tank, pump, supply line, and return line being in fluid communication with each other, and wherein the nozzles and the collector are displaced a horizontal distance from each other in a direction parallel to the plane orthogonal to gravity such that outlets of the nozzles are not vertically above the collector. Such fountains may be modified by any permutation of the features described herein, particularly the following.

The collector(s) may have a conic, hemispheric, and/or urn shape.

The collector(s) may be configured to receive a volume of water projected at least the horizontal distance from the nozzles, and the collectors may be in fluid communication with the return line.

Inventive fountains may further comprise: a third nozzle and a third nozzle controller; a fourth nozzle and a fourth nozzle controller; and a second collector configured to receive water projected from the third and fourth nozzles. Inventive fountains may comprise at least 10 of the nozzle controllers and at least 5 of the collectors. The collectors may be arranged substantially linearly to each other along a first line, with the nozzles being arranged substantially linearly to each other along a second line, and the first and second lines being horizontally displaced from each other and parallel to each other, such that the collectors are arranged opposite and in parallel to the nozzles. The nozzles may be configured to project water in a jet direction including both an upward vertical and a horizontal component. The first and second nozzles may be arranged to project water in a coplanar manner towards the first collector, with a first water stream from the first nozzle being vertically above a second water stream from the second nozzle.

The first and second nozzles may be arranged on a common hinge, such that there is an angle between the first and second nozzles. The first and second nozzles may be vertically no higher than the collector.

The water projection angle from the nozzles may increase with a decreasing distance to the at least one target, the water projection angle of the nozzles having a maximum of 70° with respect to the plane orthogonal to gravity, with the decreasing distance being determined by the proximity sensors. The water projection angle from the nozzles may decrease with an increasing distance to the at least one target, the water projection angle of the nozzles having a minimum of 30° with respect to the plane orthogonal to gravity, with the increasing distance being determined by the proximity sensors. The water projection angle of each of the nozzles may be independent to other nozzles.

Inventive fountains may comprise at least three of the proximity sensors.

The tank may be surrounded on all sides by walls such that water cannot evaporate from the tank, with the fountain obtaining at least 50 wt. % of its water from the tank. Inventive fountains may be configured to draw water only from the tank, wherein the tank draws water from a municipal source.

Aspects of the invention provide methods of operating a water system, which methods may comprise: detecting the motion of a human with any permutation of the inventive fountain described herein; and projecting water from the nozzles to the collectors.

Aspects of the invention provide methods of conserving water during use of a fountain, which methods may comprise: projecting water from a nozzle to a collector across a horizontal displacement and a vertical displacement, while collecting at least 95 wt. % of the water projected in the collector, wherein the fountain comprises proximity sensors configured to detect at least one target, a processing unit with which the proximity sensors are communicably coupled and to which the proximity sensors are configured to transfer data related to the at least one target, nozzles, nozzle controllers, and collectors configured to receive water projected from the nozzles, the processing unit being communicably coupled to the nozzle controllers, the nozzle controllers being controllable according to the data received from the proximity sensors, the nozzle controllers being mechanically coupled to the nozzles of a water circulation system configured to adjust a water projection angle from the nozzles with respect to a plane orthogonal to gravity, and wherein the water circulation system comprises a tank, a pump, a supply line, and a return line, the nozzles, tank, pump, supply line, and return line being in fluid communication with each other without a body of water exposed to the environment besides the water projected.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
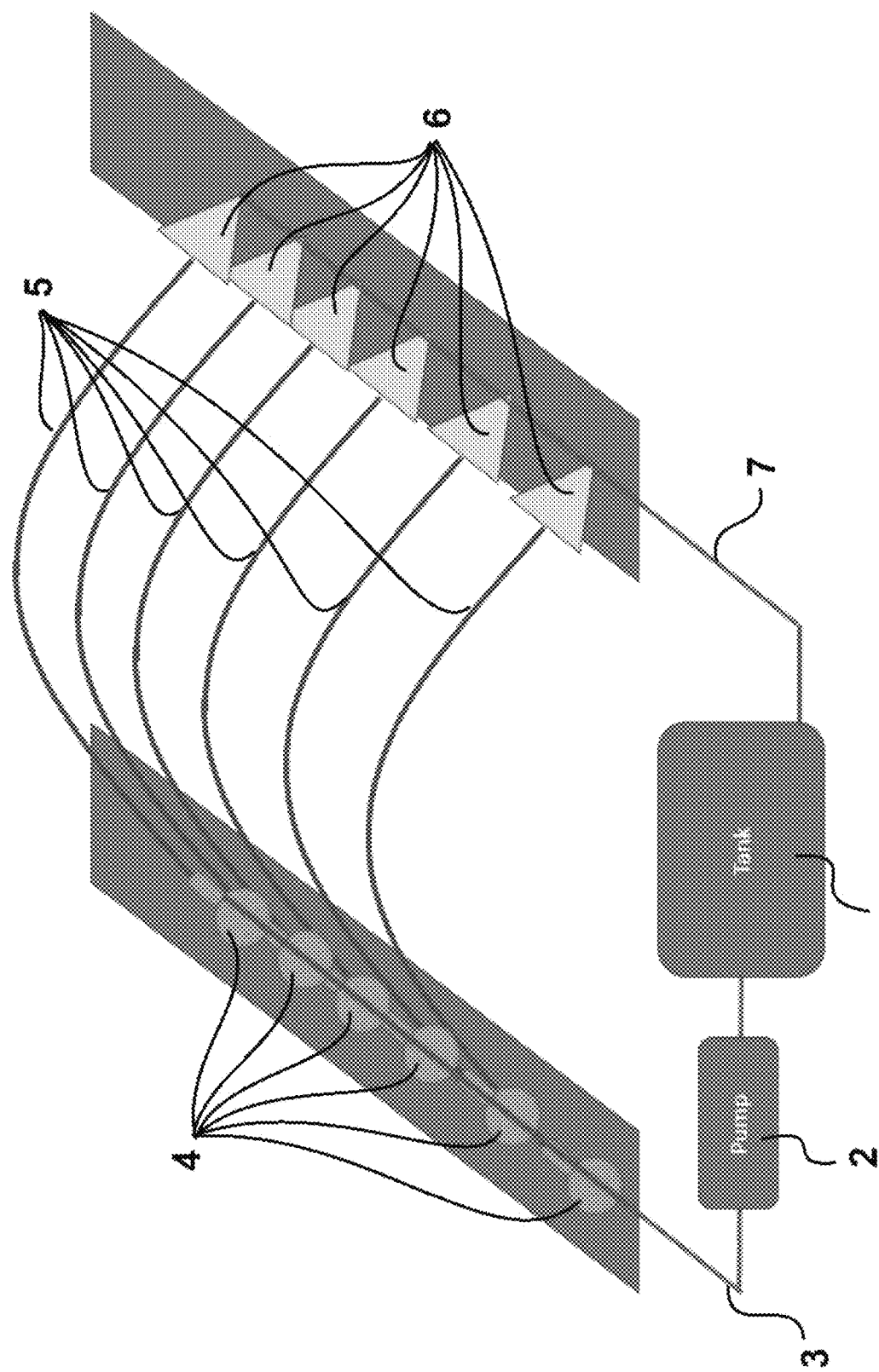
FIG. 1 shows a representative sketch of an exemplary inventive fountain.

Aspects of the invention provide proximity triggered water fountains, i.e., fountains which may contain a variety of sensors, such as piezoelectric sensors and/or pads, capacitive sensors, capacitive displacement sensors, inductive sensors, magnetic (proximity) sensors, (passive) infrared sensors, charge-coupled sensors, audio sensors, microwave sensors, sonar sensors, fiber optics sensors, ultrasonic sensors, tomographic (e.g., radio) sensors, photodetectors (e.g., reflective photocell, laser rangefinders, etc.), Hall effect sensors, dual technology sensors, pressure sensors and/or other standard detectors useful for motion detection and object discrimination, to initiate and/or terminate activity of the fountains. Inventive fountains may comprise: a first proximity sensor configured to detect at least one target (e.g., an approaching object, particularly animate object, such as a human and particularly an adult human); a second proximity sensor configured to detect the at least one target; a processing unit (basically any suitable kind known in the art or otherwise applicable) with which the proximity sensors are communicably coupled—typically with a wire and/or wirelessly, the proximity sensors being further configured to transfer data related to the at least one target ("target data") to the processing unit; a first nozzle and a first nozzle controller, generally mounted on a motorized apparatus, such as a servo motor, allowing the nozzles to rotate in XYZ-space, typically by a horizontal and vertical rotator and/or translator, but by any mechanism known; a second nozzle and a second nozzle controller which may be identical to or different from the first and which second nozzle controller may be functioning with the first nozzle controller from a single component; and a first collector configured to receive water projected from the first and/or second nozzles. That is, the water jetting unit—typically including the controller(s), motor(s), and nozzle(s)—may include one, two, three, or more nozzles, which may project an equivalent (1 nozzle:1 stream) or greater (1 nozzle:2 streams) number of streams. Each water jetting unit may be independently configured to project all water streams from the particular unit into one collector, or configured to project half or one third or fractional portion of its streams to two, three, etc. collectors. The processing unit is communicably coupled to the nozzle controllers, i.e., via a suitable copper, aluminum, gold, or fiber-optic cable and/or wireless connection.

The nozzle controllers may be configured to be controlled according to, i.e., based upon, the data received from the proximity sensors, in that the sensors may detect one or more animate objects, optionally distinguishing them based on size and/or typical adult human heat signatures (compared to a combustion engine, dogs, squirrels, birds, children, and/or infants) and provide data including (i) distance(s) to the fountain location(s), (ii) presence in a particular geometric space(s), quadrant(s), or octant(s) within a detection area(s); (iii) the estimated height(s), weight(s), and/or volume(s) of the detected object(s); (iv) the rate(s) of motion of the detected object(s); (v) acceleration(s) of the detected object(s); and/or (vi) trajectory of the detected object(s); and the like.

The nozzle controllers may be mechanically coupled to and optionally integral with the nozzles of a water circulation system, which water circulation system configured to adjust a water projection angle from the nozzles with respect to a plane orthogonal to gravity. The plane orthogonal to gravity may be the ground, a road, a walkway, a paved/tiled/asphalted surface, or the like. The water circulation system may comprise a tank, which will typically be below the surface (but is not required to be), one or more pumps suitable for urging water or fluids through plumbing, a supply line suitable to lead water from the tank to the nozzles, and a return line suitable to receive jetted water from the collectors and returning it to the tank. The tank may have a cylindrical or pill shape, or may be prismatic or (partially) conical or spherical, and the tank may be fed by recycled water from the collectors, via the return line, as well as by water from, e.g. a municipality or well or the like, typically fed through municipal/city plumbing. The nozzles, tank, pump, supply line, and return line are generally in fluid communication with each other such that a cycle is created from the receiving to jetting side of the projection, i.e., collecting jetted water in the collector and returning it through the tank to the nozzle, typically driven by a pump. Inventive fountains may recycle and/or conserve at least 50, 60, 70, 75, 80, 85, 90, or 95 wt. % of the total water weight relative to a fountain in which the tank were open to the environment or otherwise using an open pool architecture. For example, inventive fountains may lose no more than 25, 20, 15, 10, 5, 4, 3, 2, 1, 0.5, 0.1, 0.001, or 0.0001 wt. % of the systemic water (excluding newly introduced water from the municipal or other feed to the tank) to evaporation.

The nozzles and the collector may be displaced a horizontal distance, i.e., at least 25, 50, 75, 100, 150, 200, 250, 300, 400, or 500 cm and/or up to 100, 50, 25, 20, 15, 12, 10, 8, 6, 5, or 4 m, from each other in a direction parallel to the plane orthogonal to gravity—e.g., displaced on the ground a distance away, and/or at a height above or below the nozzle (outlet) some horizonal distance away—such that outlets of the nozzles are not vertically above the collector. For example, the nozzles are generally not arranged such that water can simply drop out in the direction of gravity and land in the collector(s), but instead should be projected some distance, particularly in an arcing manner generally first upwards, then downwards, across the horizontal distance. In the case of two or more jets/streams from the nozzle(s), the jets/streams may be arranged such that the there is an upper and one or more lower jets/streams vertically in-plane with each other, optionally including an intersection point in the trajectory, preferably before (e.g., 100, 75, 60, 50, 40, 35, 30, 25, 20, 15, 10, or 5 cm) or at the collector. The jets/streams may also be out of plane from each such that the upper stream lands in a different collector than one or more of the lower jets/streams.

The collector(s) may have a conic, hemispheric, and/or urn shape. The collectors may each have the same shape, may all differ, or may be organized in patterns (e.g., A-A-B-B-C-C . . . , A-B-A-B-A-B . . . , A-B-C-A-B-C . . . , A-A-A-B-B-B-C-C-C . . . , A-A-B-B-A-A . . . , etc.). Generally, the collectors should have an opening sufficient to receive at least 90, 91, 92, 92.5, 93, 94, 95, 96, 97, 97.5, 98, 99, 99.1, 99.5, or 99.9 wt. % of a total weight of the jetted water without splattering and/or misalignment losses. The collector may have an inlet portion which is circular, ovular, square, rectangular, triangular, hexagonal, rhombodal, trapezoidal, or the like, in cross-section. The inlet portion may have a shortest and/or longest dimension of, e.g., at least 5, 10, 15, 20, or 25 cm and/or up to 150, 125, 100, 90, 80, 75, 70, 65, 60, 55, 50, 45, 40, 35, or 30 cm. The collector may be arranged such that the inlet portion has the largest cross-sectional dimension (viewed from the axis of the water jet/stream), e.g., as a cone or quadratic-walled shape, or the collectors may have a substantially constant cross-section, e.g., cylindrical or prismatic. A base (outlet) portion of the collectors may be conical or rounded (e.g., hemispherical) in shape. The collectors may be lined internally and/or positioned to minimize splashing, and/or the collectors may be upon corresponding motors and/or translators (for tilting and/or moving) to the nozzles such that the collectors may be angled for an ideal or preferred reception of the water stream.

The collector(s) may be configured to receive a volume of water projected at least the horizontal distance from the nozzles, e.g., the water jet/stream from the nozzle should generally traverse at least the distance of displacement between the nozzle and the collector, to the extent it is aimed to reduce water loss. The landing point of the trajectory between the nozzle and collector may be, e.g., at least 1, 2, 2.5, 3.33, or 5% and/or up to 25, 20, 15, 10, 7.5, 5, or 2.5% of the horizontal distance. The collectors will typically be in fluid communication with the return line such that jetted water can be recycled.

Inventive fountains may further comprise: a third nozzle and a third nozzle controller; a fourth nozzle and a fourth nozzle controller; and a second (or third or fourth) collector configured to receive water projected from the third and/or fourth nozzles. Inventive fountains may be laid out such that water projecting unit has one, two, three, or more nozzles, which may project water streams into one, two, three, or more collectors, though 1:1 or 2:1 are generally seen to be typically applicable. Inventive fountains may comprise at least 10 of the nozzles and/or nozzle controllers and at least 5 (or 10) of the collectors. Inventive fountains may comprise 2, 3, 4, 5, 6, 7, 8, 9, 10, 12, 14, 16, 20, 24, 30, 50, 100, or more of the nozzles and/or nozzle controllers and 1, 2, 3, 4, 5, 6, 7, 8, 9, 10, 12, 14, 16, 18, 20, 24, 30, 50, 100, or more of the collectors. Generally the numerical relationship of the nozzles to the collectors will be 1:1, 2:1, 3:1, or 4:1, in symmetric arrangements, though the count of nozzles and streams may vary along an installation, e.g., 2-1-2-1-2-1 . . . , 1-2-3-4- . . . , 1-2-3-1-2-3 . . . , 1-2-3-2-1-2-3-2-1 . . . , 1-2-3-4-3-2-1 . . . , 1-1-2-2-1-1-2-2 . . . , 1-1-2-2-3-3-4-4 . . . , 1-1-2-2-3-3-2-2-1-1 . . . , etc. Such patterned displays may engender a pleasant psychological and/or aesthetic effect. The streams may be interruptable depending upon the presence or absence of a detected object.

The collectors may be arranged substantially linearly to each other along a first line, with the nozzles being arranged substantially linearly to each other along a second line, and the first and second lines being horizontally displaced from each other and parallel to each other, such that the collectors are arranged opposite and in parallel to the nozzles. Such a display is essentially depicted in the exemplary drawings. However, the nozzles and collectors may follow a stepped pattern, a see-saw pattern, a circular or ovular arch pattern, a V pattern, a diverging functional pattern (a line and a curve, two curves, two lines of different slope, etc.). Linear or other arrangements may be designed to conform to a walk way, such as projecting across a walkway, or projecting parallel to a walkway, or may simply decorate a public square or building/mall interior. The 1, 2, 3, or more lines (rows) of nozzles and/or collectors may independently have a length of, e.g., at least 50, 100, 200, 300, 400, or 500 cm and/or up to 200, 150, 100, 75, 60, 50, 40, 35, 30, 25, 20, 15, or 10 m.

As explained above, the nozzles may be configured to project water in a jet direction including both an upward vertical and a horizontal component, such as in an arch, generally upwards, then downwards, as opposed to merely directly horizontal, then downwards, or directly downwards (with respect to gravity). As explained above, the first and second (third, fourth, etc.) nozzles may be arranged to project water in a coplanar manner towards the first collector, with a first water stream from the first nozzle being vertically above a second water stream from the second nozzle. Alternatively, the first and second (third, fourth, etc.) nozzles may be arranged to project water in a skewed patter, e.g., in a hub-and-spoke pattern along a curved or circular path or area, or in a manner wherein collectors and nozzles alternate location along two (or more) lines, see-saws, steps, etc., to alternatingly project triangular streams in a left, right, left, right, left . . . pattern.

The first and second nozzles may be arranged on a common hinge (rotating vertically and/or horizontally), such that there is an optionally changeable angle between the first and second nozzles, e.g., at least 3, 6, 9, 12, 15, 18, 21, 24, 27, or 30° and/or up to 60, 57, 54, 51, 48, 45, 42, 39, 36, 33, or 30°. The first and second nozzles, e.g., when attached to the same hinge or when upon separate water projecting units, may be vertically no higher than the collector. That is, the nozzles may be independently above, even with, or below the collectors in height (or in a direction anti-parallel to gravity). The arrangement of the nozzles and/or collectors may be such that the row of collectors and/or nozzles varies in height (going along the first and/or second line), e.g., high-low-high-low . . . , high-high-low-low-high-high . . . , low-higher-higher-higher . . . . , low-high-higher-high-low . . . , or the like. The differences in height may independently be, e.g., at least 2.5, 3, 4, 5, 6, 7.5, 10, 15, 20, 25, or 30 cm and/or up to 200, 175, 150, 125, 100, 75, 60, 50, 40, 35, 30, 25, or 20 cm (or 1, 2, 3, 4, 5, 6, 8, or 12" and/or up to 5, 4, 3, 2.5, 2, 1.5, 1, or 0.5').

The water projection angle from the nozzles may increase with a decreasing distance to the at least one target, the water projection angle of the nozzles having a maximum of 45, 50, 55, 60, 65, or 70° with respect to the plane orthogonal to gravity (generally the ground or a platform upon which the nozzles may rest), with the decreasing distance being determined by the proximity sensors. The water projection angle from the nozzles may decrease with an increasing distance to the at least one target, the water projection angle of the nozzles having a minimum of 45, 42, 39, 36, 33, or 30° with respect to the plane orthogonal to gravity, with the increasing distance being determined by the proximity sensors. The rate of change in the angles, whether decreasing or increase, may be made to depend upon the rate of approach of the sensed target and may be, e.g., at least 3, 6, 9, 12, 15, 18, 21, 24, 27, 30, 45, 60, or 90°/s and/or up to 3000, 2700, 2400, 2100, 1800, 1500, 1200, 900, 600, or 300°/s. The water projection angle of each of the nozzles may be independent to other nozzles (or sets of nozzles), such that the fountain makes a stepped or cascade appearance. Alternatively, all water projection angles may be identical once the sensed object is detected within the desired range, i.e., "springing on."

Inventive fountains may comprise at least three, four, five, six, or more of the proximity sensors. The sensors may also differ from each other, e.g., employ different sensing technology, and/or may have different sensitivity, e.g., based upon their location with respect to a critical or more frequented detection area.

The tank may be surrounded on all sides by walls (which may be penetrated only by piping for the fountain system and a feed line) such that water cannot evaporate from the tank, with the fountain obtaining at least 50, 60, 70, 75, 80, 85, 90, 95, 97.5, 98, or 99 wt. % (or all) of its water from the tank, which may be submerged in the earth or in a platform. Inventive fountains may be configured to draw water only from the tank, wherein the tank draws water from a municipal source, e.g., only to compensate for losses from splashing and/or evaporation.

Inventive fountains may include one or more collectors further configured with a diverting or deflecting panel that is triggered by the processing unit. The diverting or deflecting panel can function to block water from entering the collector and redirects its motion. A diverting or deflecting panel functions as a way to redirect the motion of water to achieve, for example, a "second bounce" of a water stream. The diverting or deflecting panel may be operable through an electric motor that is communicatively coupled with the processing unit. On receiving a signal from the processing unit, the diverting or deflecting panel may be triggered to block the entrance to the collector and/or may be structured in a manner such that water hitting the diverting or deflecting panel moves in a trajectory away from the collector and optionally in a stream that is parallel to the incoming stream of water without redirection at an angle of more than 90° orthogonal to the incoming water stream.

Inventive fountains may operate or rest on a plane. For example, the plane may define an open area such as a public square or gathering place. One or more pressure sensors may be embedded in the plane between the nozzles and the collectors. The pressure sensors are communicatively coupled with the processing unit and serve as a further input for triggering a waterjet projected from a nozzle or for triggering disruption or stoppage of a waterjet projecting from a nozzle. The pressure sensor may likewise trigger a diverting or deflecting panel. Pressure sensors may also be placed in proximity of the nozzles and collectors in the plane in which the fountain is installed but in an area that is outside the plane between the nozzle and the collectors but remains proximal to the nozzle and/or collector. Additional pressure sensors may provide further input and signaling for the processing unit and thereby permit additional control configurations that trigger and/or stop water flow from one or more nozzles.

Aspects of the invention provide methods of operating a water system, which methods may comprise: detecting the motion of a human with any permutation of the inventive fountain described herein; and projecting water from the nozzles to the collectors. Such methods may include, for example, distinguishing between humans and non-human animals, between humans based upon size, between animate and inanimate objects, between flying and walking objects, and/or between objects moving at different velocities.

Aspects of the invention provide methods of conserving water during use of a fountain, which methods may comprise: projecting water from a nozzle to a collector across a horizontal displacement and a vertical displacement, as described above (typically arching) while collecting at least 95, 96, 97, 97.5, 98, 99, 99.1, 99.5, or 99.9 wt. % of the water projected in the collector (rather than in a pool or standing body, exposed to the environment), wherein the fountain may be any inventive permutation described herein. The fountain may comprise proximity sensors configured to detect at least one target, a processing unit with which the proximity sensors are communicably coupled and to which the proximity sensors are configured to transfer data related to the at least one target, nozzles, nozzle controllers, and collectors configured to receive water projected from the nozzles, the processing unit being communicably coupled to the nozzle controllers, the nozzle controllers being controllable according to the data received from the proximity sensors, the nozzle controllers being mechanically coupled to the nozzles of a water circulation system configured to adjust a water projection angle from the nozzles with respect to a plane orthogonal to gravity, and wherein the water circulation system comprises a tank, a pump, a supply line, and a return line, the nozzles, tank, pump, supply line, and return line being in fluid communication with each other. Such fountains may avoid a body of water exposed to the environment besides the water projected, to thereby minimize loss due to evaporation. Inventive arrangements may have one or more (or all) of the nozzle/jet components within 50, 40, 30, 20, 15, 10, or 5 cm of the ground, or below the ground surface. Such nozzle/jet components may be directly connected with no intervening reservoir, bath, or tank to a line in from a feed source, typically a standard-gauge pipe, having a cross-section of, e.g., no more than 10, 9, 8, 7, 6, 5, 4, 3, 2.5, or 2 cm and/or at least 1, 2, 2.5, 3, 4, or 5 cm, typically of circular cross-sectional shape.

Inventive arrangements may include lighting, sound, and/or listening systems, such as lighting in the nozzle to create an appearance of colored (e.g., blue, red, yellow, green, orange, purple, etc.) water, to provide music, nature sounds (e.g., trickling water, splashing water, wind, etc.), animal sounds (e.g., canary, owl, monkey, predatory cat, elephant, etc.), ad/or music, and/or to enhance the sensitivity of detecting/locating sensed targets, or may exclude any of these.

Inventive arrangements will typically include spacing between the jets/nozzles and the collector(s), including soil, sand, grass, bushes, flower beds, cement, pavement, planter boxes, benches, pavers, asphalt, bricks, marble, sandstone, granite, and/or other stone.

Aspects of the invention provide smart fountains that may be equipped with proximity sensors, have adaptive heights based on occupancy (or distance of people), and/or be designed to eliminate or minimize) water spills. Inventive fountains can be installed without a need for a pool. Inventive fountains can be used inside or outside of buildings. Inventive fountains may be aesthetically pleasing and/or require minimal maintenance, particularly due to at or near zero water spills. Aspects of the invention provide malls, restaurants, shopping areas, university campus, libraries, parks, and the like, including such inventive fountains.

An aspect of the invention involves fountains capable of maintaining, e.g., at least 50, 55, 60, 65, 67.5, 70, 72.5, 75, 77.5, 80, 82.5, 85, 87.5, 90, 91, 92, 92.5, 93, 94, 95, 96, 97, 97.5, 98, 99, 99.1, 99.5, or 99.9 wt. % and/or up to 99.999, 99.99, 99.9, 99.5, 99.1, 99, 98.5, 98, 97.5, 96, 95, 94, 93, 92.5, 92, 91, 90, 87.5, 85, 82.5, or 80 wt. % of a total weight of the water circulated, or a constant amount, over a specific time period such as 6, 12, 18, 24, 48, 72, 96, or 120 hours on average throughout the year. Aspects of the invention provide fountains with minimal water losses, e.g., to evaporation, to splattering, to jetting outside of the fountain, and/or other loss sources, including in the summer. Aspects of the invention include collecting the water projected through the fountain and/or otherwise cycled in the fountain after it is projected by, e.g., 1, 2, 3, 4, 5, 6, 7, 8, 9, 10, 15, 20, 25, 50, 75, 100, 150, 200, 250, or more servo motors through, e.g., 1, 2, 3, 4, 5, 6, 7, 8, 9, 10, or more nozzles.

The projection/jetting of inventive fountains may involve changing the angle of the nozzle, and thus the initial projection angle relative to the plane orthogonal to gravity, from $\alpha_{min}$ and $\alpha_{max}$ (see FIGS. 5 and 6), e.g., at least 10, 15, 18, 21, 24, 27, 30, 33, 36, 39, 42, 45, 48, 51, 54, 57, or 60° and/or up to 75, 72, 69, 66, 63, 60, 57, 54, 51, 48, 45, 42, 39, 36, 33, or 30°, or any continuous range using any of these endpoints. Inventive fountains may project water in 2 (or 3, 4, 5, 6, or more) streams such that the water travels to $A_{max}$ and $A_{min}$ respectively, intersecting at a virtual point $A_{intersection}$. The height of $A_{max}$ may be, for example 100, 150, 175, 200, 225, 250, 275, 300, 350, 400, 500, 750, 1000 cm, or more and/or up to 500, 400, 350, 300, 250, 200, 175, 150, 125, 100, 75, 50, 40, 35, 30, 25, 20, 15, 12.5, 10, 9, 8, 7.5, 7, 6, or 5 m, and/or $A_{min}$ may be, for example, 50, 60, 70, 75, 80, 85, 90, or 95% of a total height of $A_{max}$. As necessary, inventive fountains may project the separate streams at different velocities to achieve a desired $A_{intersection}$, e.g., $v_{min}$ and $v_{max}$ in the case of two jets, wherein $v_{min}$ may be, for example, 50, 55, 60, 65, 70, 72.5, 75, 77.5, 80, 82.5, 85, 87.5, 90, 91, 92, 92.5, 93, 94, 95, 96, 97, 97.5, 98, 99, or 99.5% of $v_{max}$.

The design of inventive fountains may be constrained to ensure minimal water spill or loss takes place, e.g., by implementing 0.1, 0.25, 0.5, 0.75, 1, 1.5, 2, 3, 4, or 5 collecting cone(s) and/or container(s) per jet at a distance such that both or all water projectile streams land in the cone/container/collector. The collector (e.g., cone) should be wide enough to accommodate the two (or three, four, five, or more) projectile streams. The collector(s) may be rotatable and mounted upon tracks upon which the collector(s) may be translated in the direction of gravity and/or in the plane orthogonal to gravity. The collector (e.g., cone) can be any shape that can accommodate the two or more projectile streams.

In general, the collector(s) (e.g., cone) may be higher than the projection nozzles, such that gravity forces water, through potential energy, back to the tank. Alternatively or additionally, a secondary pump can be used to send the water back to the tank.

Inventive systems typically comprise both a hydraulic circuit and a control system. Useful hydraulic circuits may comprise, inter alia, water tank(s), pump(s), nozzles with servos configured to allow the adjustment the angle of water, and collector(s) such as one or more receiving cones configured to collect water effectively even if the angle of water jet is varied. The collector is generally designed to allow the water from the minimum angle, $\alpha_{min}$, of nozzle and maximum angle, $\alpha_{max}$, of nozzle to be collected without spilling and preferably further without translating/moving the collector.

Useful control systems typically comprise components configured to drive the angle of the nozzles based on proximity, including, for example, an input to the control system suitable for the measurement of 1, 2, 3, 4, 5, or more proximity sensors, and an output configured for angle command such as a pulse width modulation (PWM) control, which may be sent to RS485 communication boards. Such RS485 board drives may e connected to the controller of the servo motor of the nozzle.

Controllers used within the scope of the invention may be programmed to work on the basic of logic including sensor signaling, timing devices, light intensity, temperature, relative humidity, and/or further indicators useful to the implementation of a water jet. The height of the water from the nozzles may be modified, e.g., by the angle of the nozzle and/or the velocity of the stream pumped through the nozzle, may be adaptive based on proximity of objects and/or persons approaching the fountain. The sensors may include an IR or other heat sensing technology so as to distinguish living beings from inanimate objects, and/or to distinguish between living beings by size (e.g., adult human from a child, infant, dog, squirrel, or the like), volume, heat signal intensity, etc. The sensors may include auditory sensors, piezoelectric sensors (e.g., for pressure in measured zones), For example, if no sensed target (e.g., human) is around the fountain, the height of the projected water by the fountain may be minimal, such as a nozzle angle of 30°±0.1, 0.3, 0.5, 0.75, 1, 2, 3, 4, 5, 6, 7, 8, or 9° (or any combination of these endpoints), and/or a height of 1 m±0.01, 0.025, 0.05, 0.075, 0.1, 0.11, 0.12, 0.125, 0.133, 0.15, 0.175, or 0.2 m (or any combination of these endpoints). If the fountain is approached by a sensed target (e.g., adult human), e.g., approaching the fountain from the left, the nozzle angle may be configured to rise linearly, exponentially, logarithmically, and/or by a mathematical function with distance between the fountain and the sensed target. For example, at a distance of 2 m of the sensed target from the first nozzle, the angle of nozzle may be adjusted to 70°±0.3, 0.6, 0.9, 1, 3, 6, 9, 12, 15, or 18° (or any combination of these endpoints) and/or a water height of 2.5 m±0.01, 0.025, 0.05, 0.075, 0.1, 0.125, 0.15, 0.175, 0.2, 0.25, 0.33, 0.5, 0.75, or 1 m (or any combination of these endpoints). The change in the nozzle angle from the rest position (e.g., any discussed above) to the raised position may be set to a constant rapid speed, e.g., 15, 30, 45, or 60°/ms), or may be programmed to adjust with the velocity of the approach of the sensed target, a multiple (e.g., 1.5, 2, 2.5, 3, 4, 5, 7.5, 10-fold, or more) of the velocity of the approach, the square of the velocity of the approach, or some other mathematical relationship to the velocity of the approach. The rest of the nozzle or jets of inventive fountains may vary their heights linearly, or in some mathematical relationship such as those described above (also independently of each other or in groups or 2, 3, 4, 5, or more, independently of other groups), as well. In other words, for example, with a first nozzle angle of 70°, the last nozzle may still be 30°, or any angular relationship described above. The nozzles in between, e.g., in a 6-nozzle arrangement, may be 62°, 54°, 46°, and 38°—in steps of 8° or the quotient of the angle difference between the first and last nozzle/jet and the number of nozzles/jets. The steps between the nozzles/jets may alternatively be in a more complex mathematical relationship to each other, such as exponential, logarithmic, natural logarithmic, or variable factored (e.g., 1n, 2n, 3n, 4n, 5n . . . ; 1n, 1.5n, 2n, 2.5n, 3n, . . . ; etc.).

Figure 4:
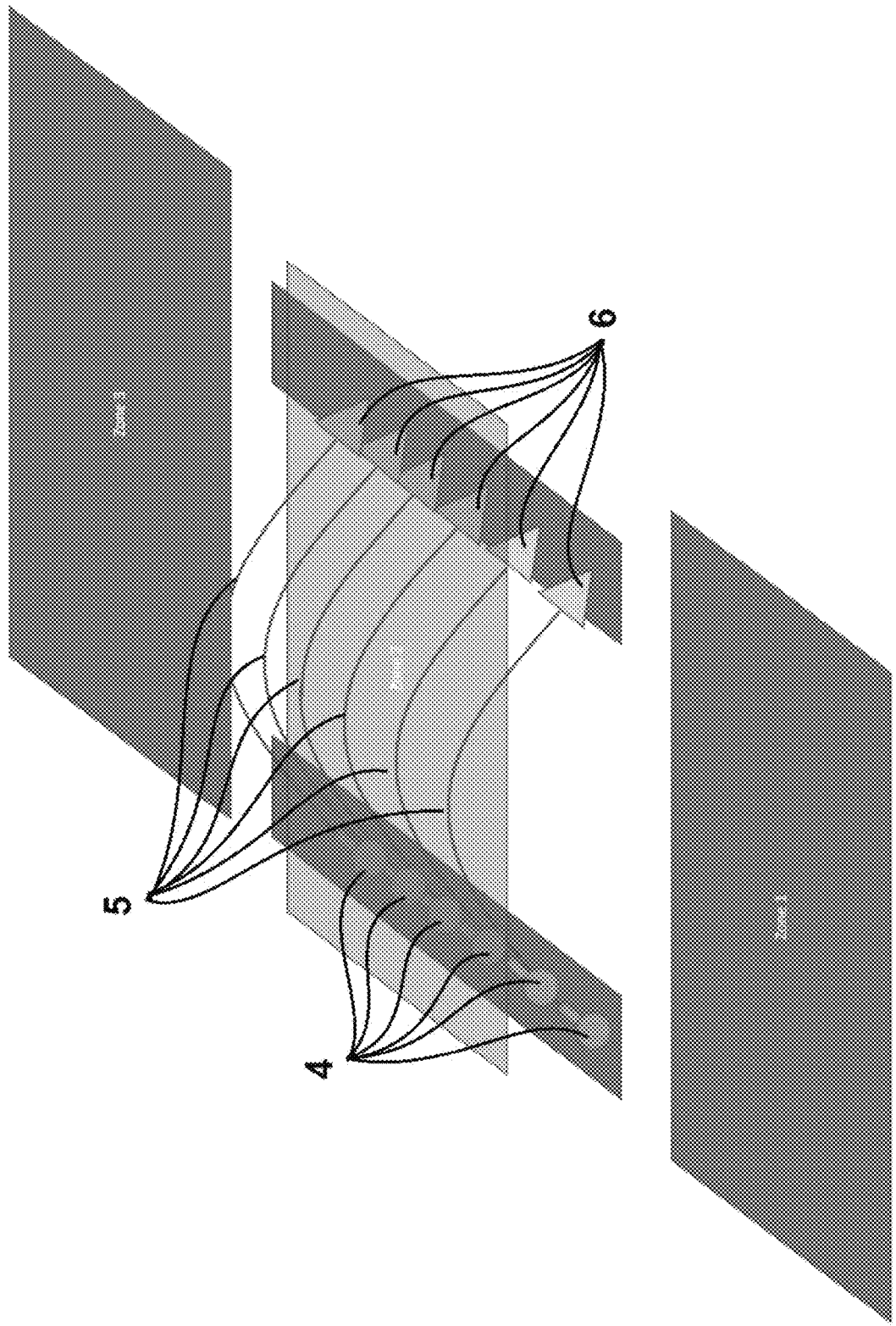
FIG. 4 shows a representative sketch of an exemplary inventive fountain designating three operation zones.

In another scenario, if two sensed targets (e.g., adult humans) approach an inventive fountain from two (opposite) sides, the end nozzles may be at 70° (or any value or range described above) if the two people are standing equidistantly at 2 m distance from the fountain, e.g., in zones 1 and 3 as seen in FIG. 4.

Referring now to the drawings, wherein like reference numerals designate identical or corresponding parts throughout the several views.

FIG. 1 shows a representative sketch of an exemplary inventive fountain comprising six nozzles (4) and six collectors (6) exemplified in conic form. Also shown in FIG. 1 are the water jets/streams of water (5) arching over a surface separating the nozzles (4) from the collectors (6), as well as a fluidly connected arrangement below the collectors (5) including a return line (7), a tank/water container (1), a pump (2), and a supply line (3) reconnecting to the nozzles (4), which may each include a, e.g., servo motor, base (not separately labelled). Different layouts, with additional nozzles (4, water projecting units) and/or collectors (6), with additional nozzle counts per water projecting unit (4), with additional water jets/streams (5) per unit, with varied nozzle (4) and/or collector (6) height, with varied or alternate water jet/stream (5) height) with staggered, non-linear, stepped, or circular layout of the nozzles (4) and/or collectors (6) are contemplated.

Figure 2:
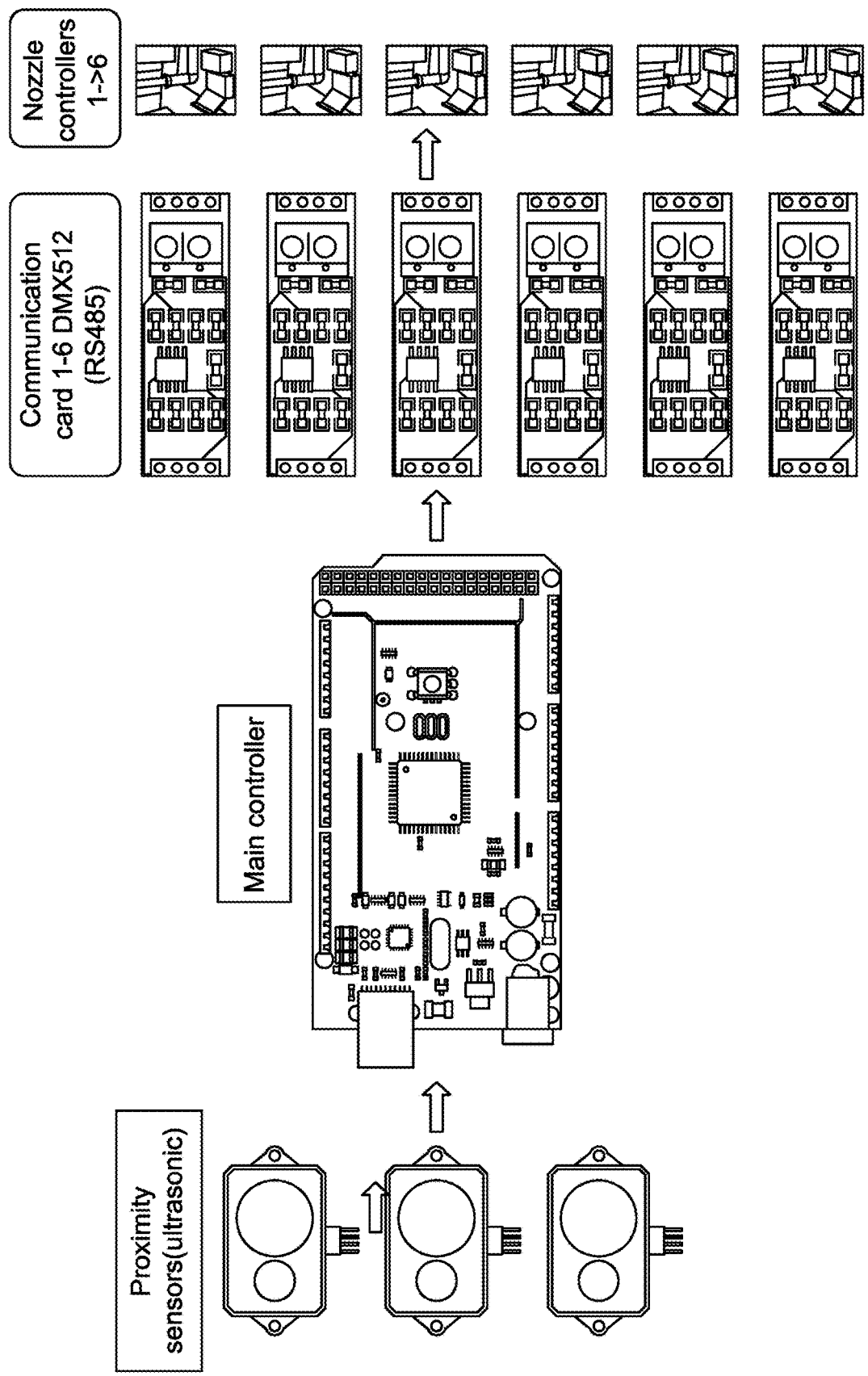
FIG. 2 shows a representative sketch in flowchart arrangement of electronics which may underlie a mechanical system controlling an exemplary inventive fountain.

FIG. 2 shows a representative sketch in flowchart arrangement of electronics which may underlie a mechanical system controlling an exemplary inventive fountain, including three proximity sensors on the left, a main controller second from left, six communication cards second from right (here exemplified as DMXS512 (RS485) cards), and six nozzle controllers on the right. The numbers of any of these particular electronic components may be varied as suitable to the desired application, combined, and/or eliminated.

Figure 3:
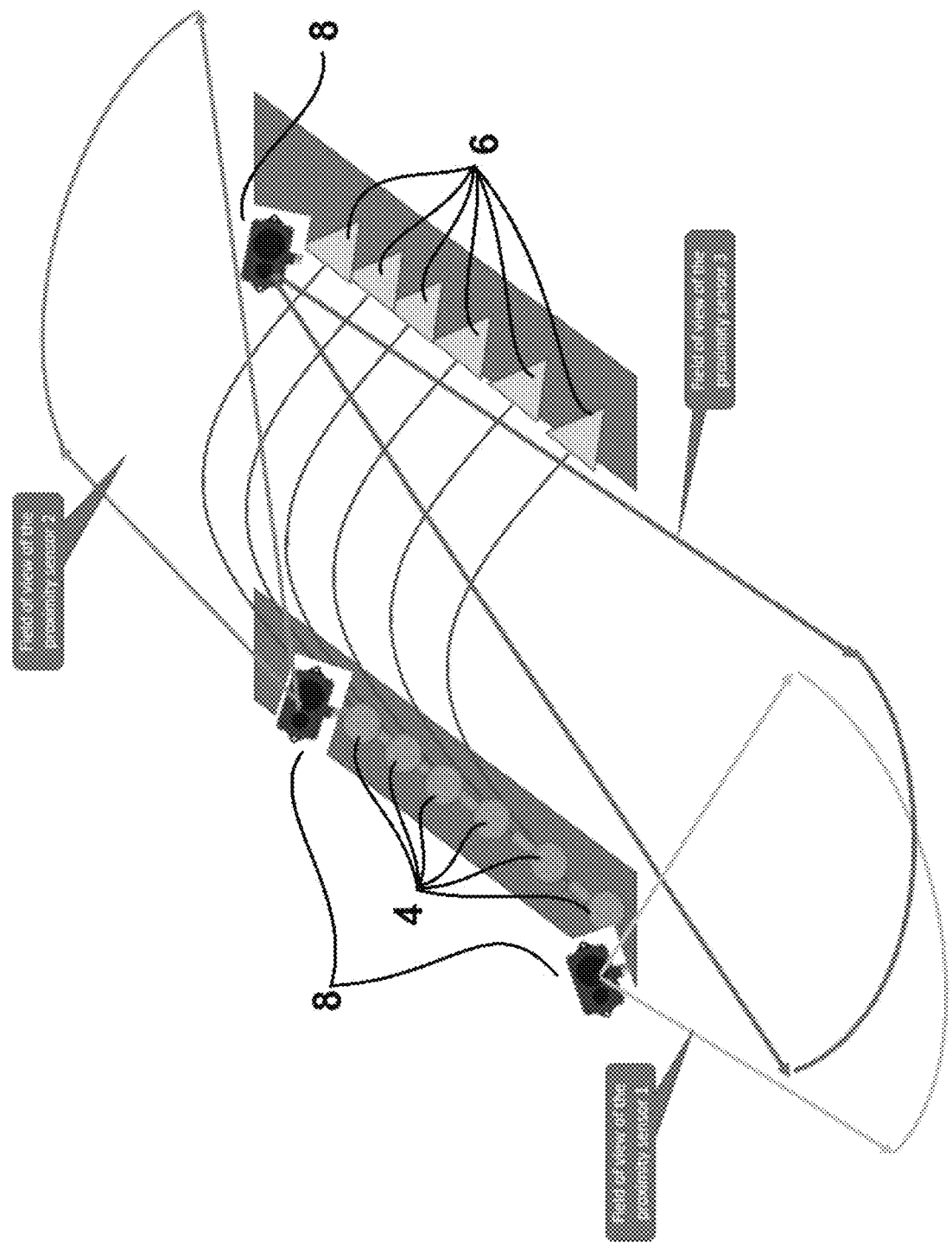
FIG. 3 shows an exemplary layout for an inventive fountain using three proximity sensors, which may be used to measure the location of people with respect to the water nozzles.

FIG. 3 shows an exemplary layout for an inventive fountain using three proximity sensors (8), which may be used to measure the location of people or other objects with respect to the water nozzles. In FIG. 3, the sensors are arranged on the corners of the layout, but the placement may be different according to the number and type of sensors, as well as the expected areas of traffic. Each sensor (8) in FIG. 3 shows a conical scope of detection, though the detection area may be circular, ovular, or the like, depending upon the type and placement of the sensor (8) used. Additional or fewer sensors (8) may also be used, e.g., at least 2, 3, 4, 5, 6, 7, 8, or more and/or (without need for limitation) up to 100, 80, 60, 50, 40, 30, 20, 18, 16, 14, 12, 10, 8, 7, 6, 5, 4, or 3 sensors, particularly depending upon the layout and the scale of the water system in question. The sensors may be on the ground, below the ground, and/or above the ground, with a height being independently 200±5, 10, 15, 20, 25, 35, 50, 75, 100, 125, 175, 185, or 195 cm above or below the base. The sensors may also be detached from the water apparatus, e.g., attached to trees, light poles, traffic signals, signs, or the like, and/or strategically place in locations of anticipated traffic, optionally giving forewarning to the fountain even before it is sighted by the target/object sensed.

FIG. 4 shows a representative sketch of an exemplary inventive fountain designating three operation zones, i.e., a first and a third zone outside of the projection/water stream (5) area, and a second zone between the nozzles (4) and collectors (6) in the path of the arched projection. The second zone could be a walkway or merely an area for visual appeal next to walkways (or traffic ways) in zones 1 and/or 3.

Figure 5:
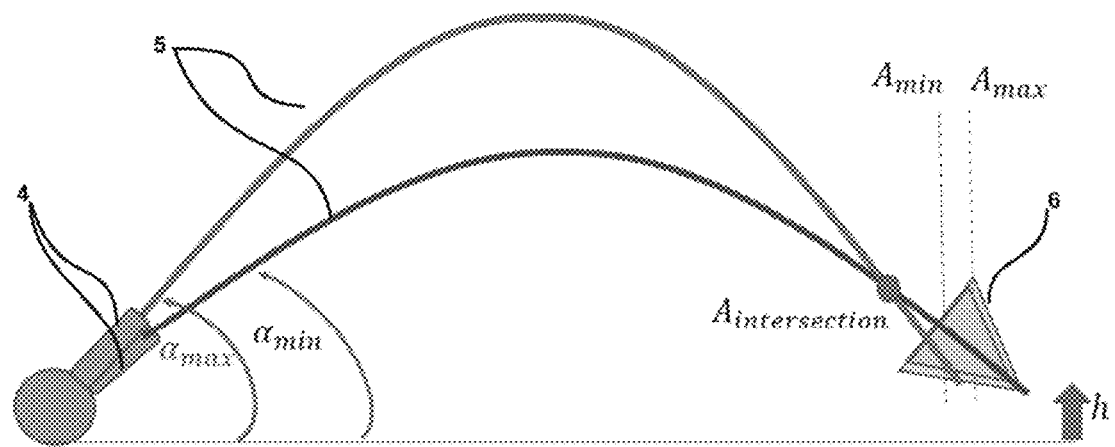
FIG. 5 shows an exemplary projection representation using a cone design to collect the water.
Figure 6:
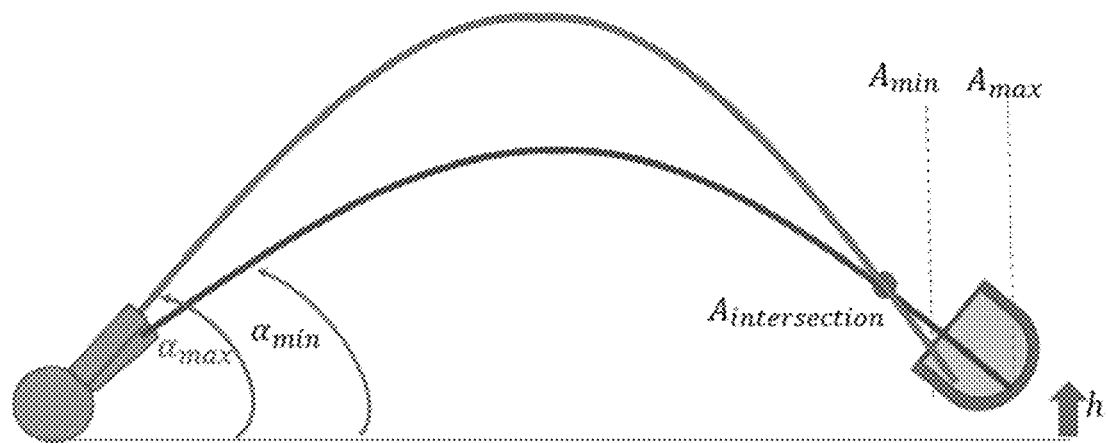
FIG. 6 shows exemplary projectile motions of water in a fountain arrangement within the scope of the invention.

FIGS. 5 and 6 show exemplary projection representations using a cone design (FIG. 5) or a rounded cylindrical design (FIG. 6) as a collector (6) to collect the water jets/streams (5) from the nozzles (4). FIG. 5 shows the quantities $\alpha_{max}$ and $\alpha_{min}$ as well as $A_{max}$ and $A_{min}$, and a point of intersection, $A_{intersection}$, which respectively correspond to the maximum and minimum projection angles of the nozzles (4) and the maximum and minimum horizontal displacement from the nozzles (4) tolerated for the shape of the water jet/stream (5) arch in order to successfully land both of the water jets/streams (5) in the collector (6) after intersecting at the point designated by $A_{intersection}$. In a system with a single pump (2), the variation of water jet/stream (5) velocity would require complicated geometries, but additional pumps may be implemented whereby one could modify trajectories by speed as well as angle.

Numerous modifications and variations of the present invention are possible in light of the above teachings. It is therefore to be understood that within the scope of the appended claims, the invention may be practiced otherwise than as specifically described herein.

REFERENCE SIGNS 1 tank/water container
2 pump
3 supply line
4 nozzle with, e.g., servo motor, base
5 water jet/stream
6 collector
7 return line
8 sensor

The invention claimed is:

1. A proximity triggered water fountain, comprising:
a first proximity sensor configured to detect at least one target;
a second proximity sensor configured to detect the at least one target;
a processor with which the proximity sensors are communicably coupled, the proximity sensors being further configured to transfer data related to the at least one target to the processor;
a first nozzle and a first nozzle controller;
a second nozzle and a second nozzle controller; and
a first collector configured to receive water projected from the first and/or second nozzles,
wherein the processor is communicably coupled to the nozzle controllers, wherein the nozzle controllers are configured to be controlled according to the data received from the proximity sensors,
wherein the nozzle controllers are mechanically coupled to the nozzles of a water circulation system configured to adjust a water projection angle from the nozzles with respect to a plane orthogonal to gravity,
wherein the water circulation system comprises a tank, a pump, a supply line, and a return line, the nozzles, tank, pump, supply line, and return line being in fluid communication with each other, and
wherein the nozzles and the collector are displaced a horizontal distance from each other in a direction parallel to the plane orthogonal to gravity such that outlets of the nozzles are not vertically above the collector,
wherein the first and second nozzles are arranged to project water in a coplanar manner towards the first collector, with a first water stream from the first nozzle being vertically above a second water stream from the second nozzle.

2. The fountain of claim 1, wherein the collector has a conic shape.

3. The fountain of claim 1, wherein the collector has a hemispheric shape.

4. The fountain of claim 1, wherein the collector has an urn shape.

5. The fountain of claim 1, wherein the collector is configured to receive a volume of water projected at least the horizontal distance from the nozzles, and
wherein the collectors are in fluid communication with the return line.

6. The fountain of claim 1, further comprising:
a third nozzle and a third nozzle controller;
a fourth nozzle and a fourth nozzle controller; and
a second collector configured to receive water projected from the third and fourth nozzles.

7. The fountain of claim 1, comprising at least 10 of the nozzle controllers and at least 5 of the collectors.

8. The fountain of claim 1, wherein the nozzles are configured to project water in a jet direction including both an upward vertical and a horizontal component.

9. The fountain of claim 1, wherein the first and second nozzles are arranged on a common hinge, such that there is an angle between the first and second nozzles.

10. The fountain of claim 1, wherein the first and second nozzles are vertically no higher than the collector.

11. A proximity triggered water fountain, comprising:
a first proximity sensor configured to detect at least one target;
a second proximity sensor configured to detect the at least one target;
a processor with which the proximity sensors are communicably coupled, the proximity sensors being further configured to transfer data related to the at least one target to the processor;
a first nozzle and a first nozzle controller;
a second nozzle and a second nozzle controller; and
a first collector configured to receive water projected from the first and/or second nozzles,
wherein the processor is communicably coupled to the nozzle controllers,
wherein the nozzle controllers are configured to be controlled according to the data received from the proximity sensors,
wherein the nozzle controllers are mechanically coupled to the nozzles of a water circulation system configured to adjust a water projection angle from the nozzles with respect to a plane orthogonal to gravity,
wherein the water circulation system comprises a tank, a pump, a supply line, and a return line, the nozzles, tank, pump, supply line, and return line being in fluid communication with each other, and
wherein the nozzles and the collector are displaced a horizontal distance from each other in a direction parallel to the plane orthogonal to gravity such that outlets of the nozzles are not vertically above the collector,
wherein the water projection angle from the nozzles increases with a decreasing distance to the at least one target, the water projection angle of the nozzles having a maximum of 70° with respect to the plane orthogonal to gravity, and
wherein the decreasing distance is determined by the proximity sensors.

12. A proximity triggered water fountain, comprising:
a first proximity sensor configured to detect at least one target;
a second proximity sensor configured to detect the at least one target;
a processor with which the proximity sensors are communicably coupled, the proximity sensors being further configured to transfer data related to the at least one target to the processor;
a first nozzle and a first nozzle controller;
a second nozzle and a second nozzle controller; and
a first collector configured to receive water projected from the first and/or second nozzles,
wherein the processor is communicably coupled to the nozzle controllers,
wherein the nozzle controllers are configured to be controlled according to the data received from the proximity sensors,
wherein the nozzle controllers are mechanically coupled to the nozzles of a water circulation system configured to adjust a water projection angle from the nozzles with respect to a plane orthogonal to gravity,
wherein the water circulation system comprises a tank, a pump, a supply line, and a return line, the nozzles, tank, pump, supply line, and return line being in fluid communication with each other, and
wherein the nozzles and the collector are displaced a horizontal distance from each other in a direction parallel to the plane orthogonal to gravity such that outlets of the nozzles are not vertically above the collector,
wherein the water projection angle from the nozzles decreases with an increasing distance to the at least one target, the water projection angle of the nozzles having a minimum of 30° with respect to the plane orthogonal to gravity, and
wherein the increasing distance is determined by the proximity sensors.

13. The fountain of claim 1, wherein the water projection angle of each of the nozzles is independent to each other.

14. The fountain of claim 1, comprising at least three of the proximity sensors.

15. The fountain of claim 1, wherein the tank is surrounded on all sides by walls such that water cannot evaporate from the tank, the fountain obtaining at least 50 wt. % of its water from the tank.

16. The fountain of claim 1, configured to draw water only from the tank, wherein the tank draws water from a municipal source.

17. A method of operating a water system, the method comprising:
    detecting the motion of a human with the fountain of claim 1; and
    projecting water from the nozzles to the collectors.

* * * * *